United States Patent
Poynton

(10) Patent No.: US 7,040,611 B2
(45) Date of Patent: May 9, 2006

(54) CHOPPING BOARD

(76) Inventor: Denis Vincent Poynton, 21 Yorlambu Parade, Maroochydore, Queensland, 4558 (AU)

( * ) Notice: Subject to any disclaimer, the term of this patent is extended or adjusted under 35 U.S.C. 154(b) by 0 days.

(21) Appl. No.: 10/961,028

(22) Filed: Oct. 12, 2004

(65) Prior Publication Data
US 2005/0098933 A1    May 12, 2005

(30) Foreign Application Priority Data
Oct. 10, 2003    (AU) .............................. 2003905528

(51) Int. Cl.
*B23Q 3/00* (2006.01)

(52) U.S. Cl. ................ 269/289 R; 269/302.1

(58) Field of Classification Search .................. 451/56, 451/529, 527, 548, 550; 269/289 R, 302.1, 269/285, 286, 307
See application file for complete search history.

(56) References Cited

U.S. PATENT DOCUMENTS

| 3,371,694 | A | * | 3/1968 | Miller | 269/289 R |
| 4,907,789 | A | * | 3/1990 | Tice | 269/13 |
| 5,386,978 | A | * | 2/1995 | Ladwig | 269/289 R |
| 6,371,470 | B1 | * | 4/2002 | Ward | 269/289 R |
| 6,722,644 | B1 | * | 4/2004 | Prosser | 269/289 R |

* cited by examiner

Primary Examiner—Lee D. Wilson
(74) Attorney, Agent, or Firm—Young & Thompson

(57) ABSTRACT

A chopping board comprises a slab of polyethylene 400× 280×10 mm made as a unitary moulding. The board includes work face 2 and has a central chopping zone 4 which drains to a liquid sump 6 2 mm deep in one corner. The top adjacent corner is bounded by intersecting walls 8 raised 20 mm above the work face 2. The wall forms two sides of a triangular aperture 10 (9×13×9 cm), the perimeter of which together with the lower edge 12 of the walls are radiussed to avoid any flat area where chopped material may adhere due to surface tension. The contact face 12 has cavities 14 to reduce weight and volume of material. A hand grip 16 also acts as a suspension ledge for a hook.

5 Claims, 1 Drawing Sheet

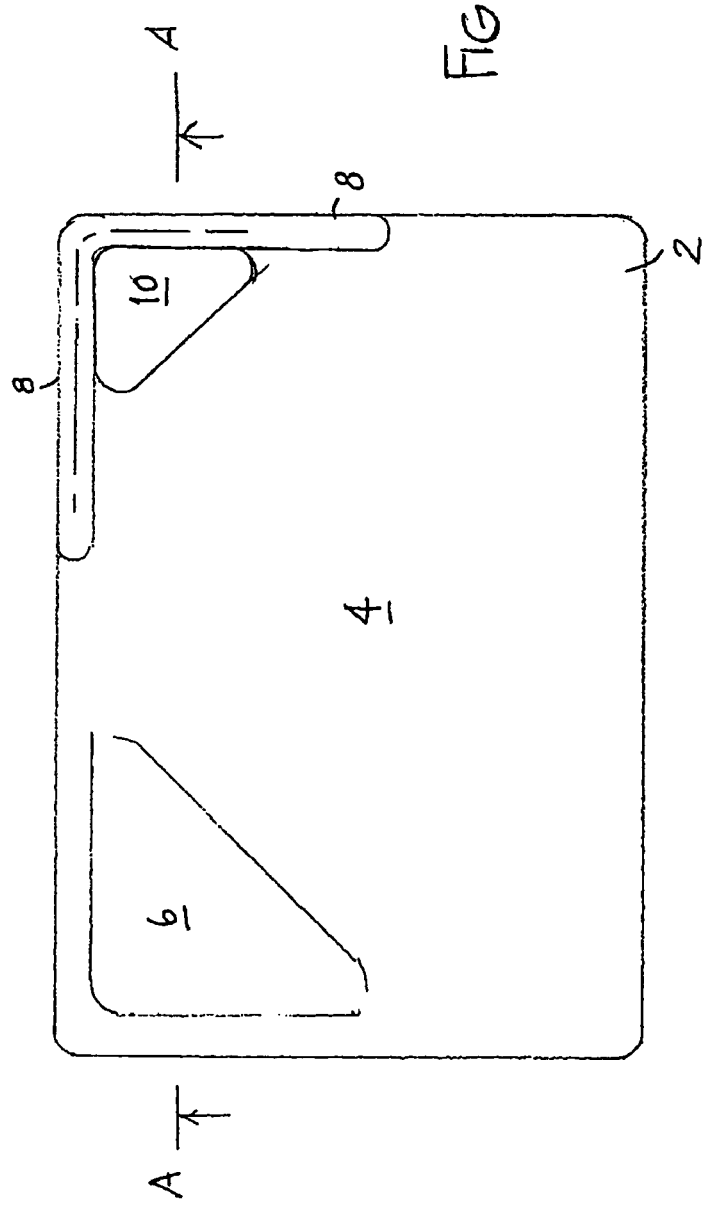
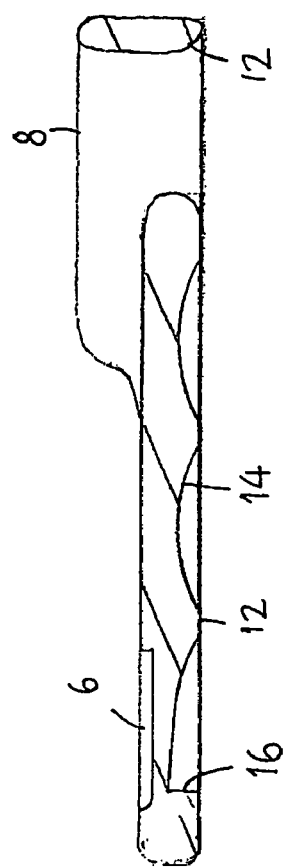

CHOPPING BOARD

FIELD OF THE INVENTION

THIS INVENTION concerns chopping boards and particularly but not limited to a kitchen chopping board to facilitate movement of chopped foodstuffs from the chopping board into a container.

BACKGROUND TO THE INVENTION

While chopping boards are useful in a kitchen for cutting food and transferring batches of chopped food to pans for subsequent cooking, they are not particularly efficient for transfer. If a blade is used to sweep chopped material from the board, spillages are common. If the hand is used, burns and scalds may result as the chopped food lands in the cooking liquid. For cooks working in commercial food preparation this is a considerable nuisance especially if food falls on heated stove elements. For handicapped persons in the home this is also a problem. As most of the population are users any technical solution must be amenable to both left and right handed people. Another problem arises by reason of the need to move the board to the receiving vessel and boards are often heavy. This is also usually a two handed process and it would be desirable to provide an arrangement whereby a single handed process is used on the board to free up the user's other hand to hold the vessel.

OUTLINE OF THE INVENTION

In one aspect this invention provides a chopping board having a working face and an aperture adjacent the working face through which chopped material falls when moved across the working face toward the aperture.

Preferably there comprises a zone and a cavity and a sweep direction across which material is moved before it crosses the working face toward the aperture, in this embodiment the aperture embraces, a cavity set proximal toward a user of the chopping board, the dimensions of the chopping board, the aperture and the cavity being such that the user drawing cut material from a distant position on the cutting board toward the proximal position on the cutting board draws that material across the aperture through the cavity and into a receiver located below the cutting board.

Preferably the edge of the board which defines the zone of the cavity opposite to the direction of the sweep is raised above the working face in order to be a barrier to the chopped material and to promote passage of the chopped material through the aperture. The raised edge of the board may be 15–25 mm above the work face.

The board may be rectangular, circular or a combination of the same. The plan shape is not critical being largely influenced by traditional shapes, but is preferable to include a corner such as a right angle and to place the aperture in the same corner. Conveniently the aperture is triangular but other shapes are useful. The part of the board surrounding the aperture tends to be used as a handle.

Alternatively, the board may have a convex part in its perimeter and the aperture may be biconvex or bean shaped in plan.

The area of the aperture is significant and needs to be larger than the hand slots sometimes provided. The minimum size is about 45 cm$^2$. The working face area may be selected to suit but will normally be less than or about 1200 cm$^2$.

The perimeter of the aperture may be tapered, convex or bull nosed in order to shed chopped material such as cucumber slices and morsels of parsley which tend to cling to flat wet surfaces. The surface may have a removable insert for chopping garlic or other stronger flavoured material because the board cannot easily be used in reverse/obverse mode as with a flat board. The insert may be reversible.

The board may be machined from a timber board, timber matrix or laminated timber stock. More usually the board will be a moulding made from food grade polymer. Injection and vacuum moulding are feasible.

The working face may be contoured by the provision of an area near the periphery of the cutting zone for the drainage of juice. This may be a sump which leaves the cutting zone dryer than it would normally be. This is intended to assist when food such as grapefruit or liver are cut.

Preferably, there is a handle opposite the aperture so that the aperture may be positioned distal from a user as chopped material is being swept though the aperture into a container below.

Preferably, the aperture has raised lead in guides adjacent the aperture to lead chopped food wept toward the aperture through the aperture. The lead in guides comprise a raised marginal edge of the board which forms a raised corner, with the aperture in the corner and there being a smooth transition between the aperture and the raised marginal edge, the edge extending part way along the board either side of the corner and further than the aperture. Typically, the aperture being generally triangular having its hypotenuse opposite the raised corner.

In another preferred form the chopping board has in use a proximal and distal side, there being a raised marginal edge of the board forming a raised corner on the proximal side to the left of centre, with the aperture in the corner and there being a smooth transition between the aperture and the raised marginal edge, the edge extending part way along the board either side of the corner and further than the aperture, the aperture being generally triangular having its hypotenuse opposite the raised corner, a liquid collection region lower than the work face being located on to the right of centre. In this embodiment it is preferable that a liquid collection region lower than the work face be located on to the right of centre and a handle underneath the board adjacent the liquid collection region.

BRIEF DESCRIPTION OF THE DRAWINGS

In order that the present invention can be clearly understood and put into practical effect the description will now refer to the drawings which show non-limiting embodiments of the invention, wherein:

FIG. 1 is a plan of the board; and

FIG. 2 is a section on A—A of FIG. 1.

DETAILED DESCRIPTION OF THE DRAWINGS

In the present embodiment the invention is shown in a slab of polyethylene 400×280×10 mm made as a unitary moulding. The work face 2 has a central chopping zone 4 which drains to a liquid sump 6 2 mm deep in one corner. The top adjacent corner is bounded by intersecting walls 8 raised 20 mm above the work face 2. The wall forms two sides of a triangular aperture 10 (9×13×9 cm), the perimeter of which together with the lower edge 12 of the walls are radiussed to avoid any flat area where chopped material may adhere due to surface tension.

The contact face 12 has cavities 14 to reduce weight and volume of material. A hand grip 16 also acts as a suspension ledge for a hook.

In use, a piece of chuck steak is place centrally and the trimmed fat is parked in the sump 6 which also drains the steak juice. The steak is then cubed. The board is now picked up in one hand and transferred to a position above a wok containing fat hot enough to brown the steak. The other hand is used sweep the cubes with the cutting blade toward the raised walls. Before the cubes contact the wall they fall through the aperture into the wok. If any splash occurs the board protects the user. In a non-illustrated version a push fit reversible insert is located in the area 18 for slicing garlic and the like.

I have found the advantages in the above embodiments to be:

1. No material leaves the board unintentionally; and
2. Geometry of the board suits left and right handed people.

Whilst the above has been given by way of illustrative example of the present invention many variations and modifications thereto will be apparent to those skilled in the art without departing from the broad ambit and scope of the invention as herein set forth in the appended claims.

The invention claimed is:

1. A chopping board, comprising:
a top edge opposite a lower edge and a working face,
the lower edge being located next to a user when the board is being used;
a liquid collection sump for collection of liquid produced from chopped material; and
an aperture adjacent the working face through which chopped material falls when moved across the working face toward and over the aperture,
the working face having a central chopping zone which drains, by a fall, to the liquid sump,
the liquid sump being in one corner adjacent the top edge and the aperture being in another corner adjacent the top edge,
the corner adjacent the aperture being bounded by intersecting walls raised above the working face to funnel chopped material through the aperture.

2. A chopping board according to claim 1 wherein the intersecting walls are formed by a raised marginal edge of the board forming a raised corner, with the aperture in the corner and there being a smooth transition between the aperture and the raised marginal edge, the raised marginal edge extending part way along the board either side of the corner and further than the aperture.

3. A chopping board according to claim 1 wherein the intersecting walls are formed by a raised marginal edge of the board forming a raised corner, with the aperture in the corner and there being a smooth transition between the aperture and the raised marginal edge, the edge extending part way along the board either side of the corner and further than the aperture, the aperture being generally triangular having its hypotenuse opposite the raised corner.

4. A chopping board, comprising:
a working face; and
an aperture adjacent the working face through which chopped material falls when moved across the working face toward the aperture,
the chopping board having in use a proximal and distal side, there being a raised marginal edge of the board forming a raised corner on the proximal side to the left of centre, with the aperture in the corner and there being a smooth transition between the aperture and the raised marginal edge, the edge extending part way along the board either side of the corner and further than the aperture, the aperture being generally triangular having its hypotenuse opposite the raised corner, a liquid collection region lower than the work face being located on the distal side to the right of centre.

5. A chopping board, comprising:
a working face; and
an aperture adjacent the working face through which chopped material falls when moved across the working face toward the aperture,
the chopping board having in use a proximal and distal side, there being a raised marginal edge of the board forming a raised corner on the proximal side to the left of centre, with the aperture in the corner and there being a smooth transition between the aperture and the raised marginal edge, the edge extending part way along the board either side of the corner and further than the aperture, the aperture being generally triangular having its hypotenuse opposite the raised corner, a liquid collection region lower than the work face being located on the distal side to the right of centre and a handle underneath the board adjacent the liquid collection region.

* * * * *